United States Patent [19]
Osborn et al.

[11] Patent Number: 6,026,391
[45] Date of Patent: Feb. 15, 2000

[54] SYSTEMS AND METHODS FOR ESTIMATING QUERY RESPONSE TIMES IN A COMPUTER SYSTEM

[75] Inventors: Andrew P. Osborn, Bath; Paolo Fragapane, Bristol, both of United Kingdom

[73] Assignee: Oracle Corporation, Redwood Shores, Calif.

[21] Appl. No.: 08/962,538

[22] Filed: Oct. 31, 1997

[51] Int. Cl.[7] .................................................. G06F 17/30
[52] U.S. Cl. ........................... 707/2; 707/3; 707/4; 707/5
[58] Field of Search .................................. 707/3, 2, 4, 5

[56] References Cited

U.S. PATENT DOCUMENTS

| | | | |
|---|---|---|---|
| 4,803,614 | 2/1989 | Banba et al. ............................ | 364/200 |
| 4,956,774 | 9/1990 | Shibamiya et al. ..................... | 364/200 |
| 5,287,459 | 2/1994 | Gniewek ................................. | 395/275 |
| 5,315,580 | 5/1994 | Phaal ....................................... | 370/13 |
| 5,379,424 | 1/1995 | Morimoto et al. ....................... | 707/10 |
| 5,412,806 | 5/1995 | Du et al. .................................. | 707/2 |
| 5,444,820 | 8/1995 | Tzes et al. ................................ | 395/22 |
| 5,459,837 | 10/1995 | Caccavale ........................... | 395/184.01 |
| 5,469,560 | 11/1995 | Beglin ..................................... | 395/439 |
| 5,504,894 | 4/1996 | Fegurson et al. ....................... | 395/650 |
| 5,572,640 | 11/1996 | Schettler ................................. | 395/140 |
| 5,694,591 | 12/1997 | Du et al. .................................. | 707/2 |
| 5,764,912 | 6/1998 | Rosborough ....................... | 395/200.54 |
| 5,794,227 | 8/1998 | Brown ...................................... | 707/2 |
| 5,852,820 | 12/1998 | Burrows .................................. | 707/2 |

*Primary Examiner*—Thomas G. Black
*Assistant Examiner*—Frantz Coby
*Attorney, Agent, or Firm*—Lyon & Lyon LLP

[57] ABSTRACT

A query performance prediction ("QPP") module is provided as part of an applications layer residing on respective user stations operating in conjunction with a centralized host computer system. The QPP module correlates estimated system cost information for a database query provided from a database management system associated with the computer system with statistics compiled from previous queries in order to estimate the system response time. In particular, an estimated CPU time for executing the present query is derived by extrapolating actual CPU times recorded for past queries having the closest estimated costs for accessing the same, or similar, tables and items in the database, using a form of a "nearest neighbor" algorithm to match the present query to either identical or statistically closest past queries. The estimated CPU time for the present query is then multiplied by a current ratio of total elapsed times-to-CPU times for the system to produce an estimated total elapsed time for responding to the query.

20 Claims, 4 Drawing Sheets

| | QUERY | DATE | TIME | USER ID | RESULT SET | SUMMARY TABLE? | EST. COST | ACT. CPU TIME | TOT. ELAPSED TIME |
|---|---|---|---|---|---|---|---|---|---|
| | 1 | 0311 | 2348 | 49 | A | Y | 200 | 12.4 | 3.8 |
| | 2 | 0311 | 2357 | 07 | B | N | 1000 | 73.6 | 122.4 |
| | 3 | 0312 | 0016 | 22 | F | N | 2000 | 198.1 | 332.9 |
| | 4 | 0312 | 0125 | 11 | A | Y | 200 | 12.4 | 3.4 |

SYSTEMS AND METHODS FOR ESTIMATING QUERY RESPONSE TIMES IN A COMPUTER SYSTEM

FIELD OF THE INVENTION

The present invention pertains generally to computer systems and, more particularly, to methods and apparatus for estimating response times for database queries in computer systems.

BACKGROUND OF THE INVENTION

In a computer system operating in conjunction with a database (e.g., a relational database), data is typically stored in the form of tables, with each column of a given table representing a particular data attribute and each row representing a specific record. A user of the computer system accesses data from one or more tables by submitting a query to a database management system ("DBMS") associated with the computer system. The DBMS responds to the query by constructing a particular view of the data stored in the database and returning a responsive data set to the user.

It is common for users of such computer systems to submit ad hoc database queries, i.e., self-structured requests of any type and/or bounds, with no up-front knowledge or information as to how long the computer system will actually take to respond. In particular, databases can be very large and, depending upon various factors, such as the current operational load on the computer system and the complexity of a particular query, the elapsed time required to execute the query can vary widely—e.g., from less than a second to several hours, or even days.

This uncertain system response time may deter users from submitting certain queries, since they will not know whether they will get an immediate answer, or will have to wait for an extended period of time. The situation is especially problematic for computer system administrators who control the amount of system resource time that is expended by users submitting ad-hoc query requests. For example, it is not uncommon for multiple users to submit overlapping queries to a centralized computer system from separate respective user stations, e.g., personal computers or network terminals, potentially degrading overall system performance and efficiency.

As a result, system administrators have been known to establish processing resource time quotas, whereby users are allowed only a certain period of time in which to obtain a response to any given system query. Under these circumstances, the time period begins to run when a user submits a query. If a response is not returned by the system before a preset time limit is reached, the DBMS abandons any further execution of the query, leaving the user with no result whatsoever, even if a response may have otherwise been produced in just an instant later. Although this (somewhat crude) methodology may preserve overall system resources, it may decrease efficiency as a result of the wasted system resource time expended for processing queries that are abandoned at the time limit.

Thus, it would be desirable to provide an up-front estimation of the system response time required for returning a response to individual database queries prior to their actual execution, so that system resource time is not expended for those queries that will not be completed within an allowable or acceptable time period.

SUMMARY OF THE INVENTION

The present invention provides methods and apparatus for providing an estimate of the elapsed time required for a computer system to respond to database queries.

In a preferred embodiment, a query performance prediction ("QPP") module is incorporated as part of an application residing on respective user stations connected to the computer system. The QPP module correlates estimated system cost information provided for each new query from the computer system DBMS with statistics compiled from previous queries in order to estimate the system response time to the present query.

In particular, for each new query, a cost optimizer located within the computer system DBMS determines a most efficient execution plan for accessing the requested data, along with an estimate of the corresponding (relative) system "cost" for executing the query. This estimated cost is returned to the QPP module at the respective user station, which employs a "nearest neighbor" algorithm to determine an estimated central processing unit ("CPU") time required for executing the present query by extrapolating CPU times recorded for past queries having the same or similar estimated costs for accessing the same, or similar, tables and items in the database. The estimated CPU time for the present query is then multiplied by a current ratio of total elapsed times to CPU times to produce an estimated total elapsed time for the system to respond to the present query.

In accordance with one aspect of the invention, each user station records pertinent information for each new user query, which is collected and maintained by the host computer 22 in a query history. The query history preferably includes for each query an identification of the particular table(s) and columns that were accessed, whether the query was satisfied from a pre-computed summary, the estimated cost for the query, the actual CPU time used in running the query and the total elapsed time required to complete the query and respond to the user. The recorded query history information is loaded by the computer system into the QPP modules of each user station; e.g., whenever a user "logs on" to the computer system, or after specified time intervals.

A readily apparent advantage gained by providing an estimated query response time to a user prior to their making a decision on whether to proceed with a query is that those queries that will not be completed within an allowable or acceptable time frame are not even started, regardless of whether the decision to proceed is based on a preset threshold limit, or user discretion. For example, if a query is estimated to take an unacceptable length of time for execution by the system, a user may simply cancel the query and move on to another task, such as submitting an alternate query. Thus, an advance estimation of system response times to database queries can result in improved system efficiency, system management and user satisfaction.

Other and further objects, features, aspects, and advantages of the present invention will become better understood with the following detailed description of the preferred embodiments illustrated in the accompanying drawings.

BRIEF DESCRIPTION OF THE ACCOMPANYING DRAWINGS

The drawings illustrate both the design and utility of preferred embodiments of the present invention, in which.

DETAILED DESCRIPTION OF THE PREFERRED EMBODIMENTS

In the following description, for purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

A computer system generally may take many forms, from a configuration including a variety of processing units, as further described herein, networked together to function as a integral entity, to a single computer, e.g., a personal computer, operational in a stand-alone environment. The present invention can be embodied in any of these computer system configurations.

Figure 1A:
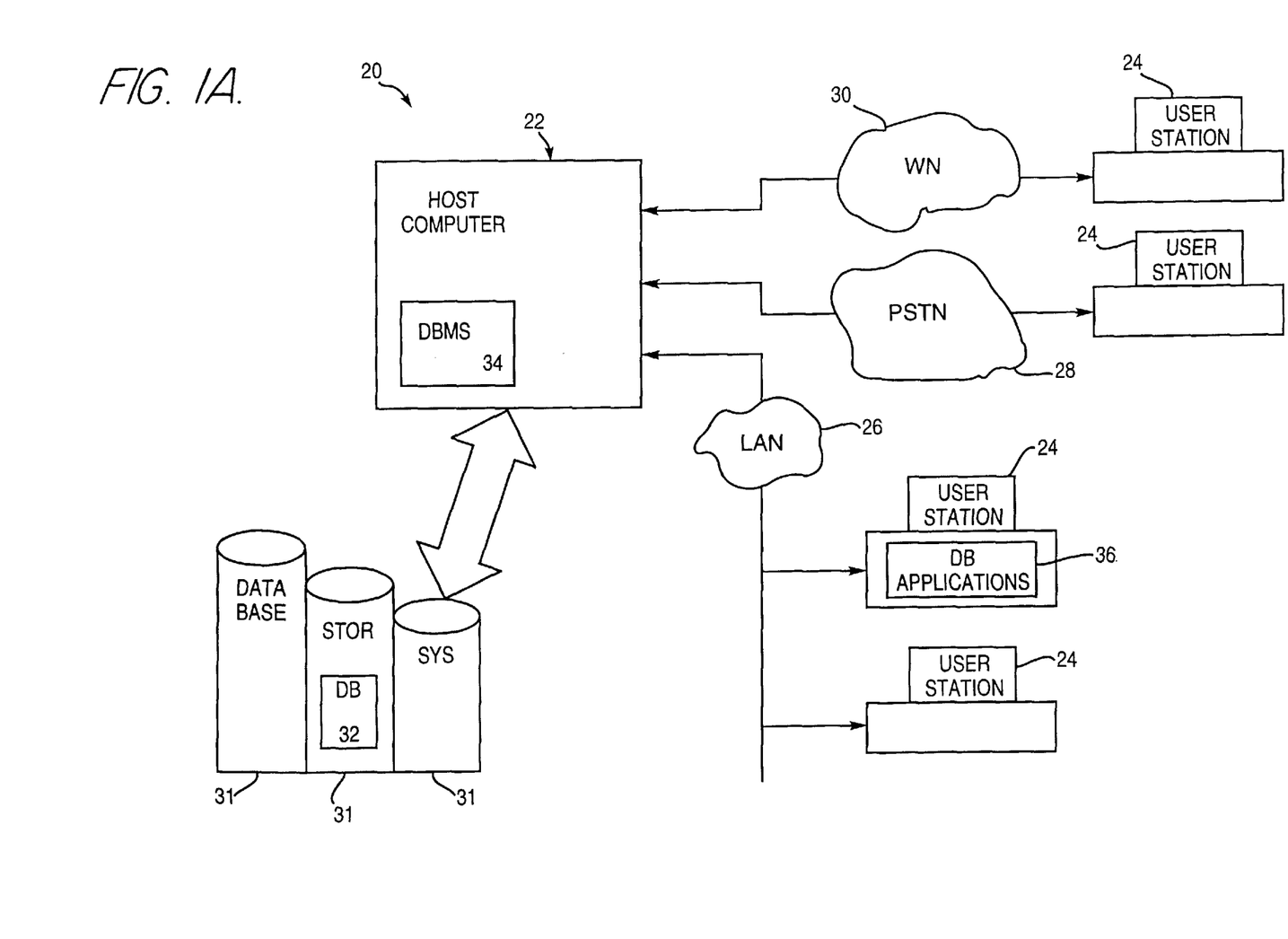
FIG. 1A is a simplified block diagram of an exemplary computer system operating in conjunction with a database.

Referring to FIG. 1A, in a presently preferred embodiment, a computer system 20 includes a host computer 22 connected to a plurality of individual user stations 24. In a presently preferred embodiment, the user stations 24 each comprise suitable data terminals, such as, e.g., personal computers, portable laptop computers, or personal data assistants ("PDAs"), which can store and independently run one or more applications (i.e., programs). For purposes of illustration, some of the user stations 24 are connected to the host computer 22 via a local area network ("LAN") 26. Other user stations 24 are remotely connected to the host computer 22 via a public telephone switched network ("PSTN") and/or a wireless network 30.

In a presently preferred embodiment, the host computer 22 operates in conjunction with a data storage system 31, wherein the storage system 31 contains a database 32 that is readily accessible by the host computer 22. In a presently preferred embodiment, the database 32 is a relational database.

In alternative embodiments, the database 32 may be resident on the host computer, stored, e.g., in the host computer's ROM, PROM, EPROM, or any other memory chip, and/or its hard disk. In yet alternative embodiments, the database 32 may be read by the host computer 22 from one or more floppy disks, flexible disks, magnetic tapes, any other magnetic medium, CD-ROMs, any other optical medium, punchcards, papertape, or any other physical medium with patterns of holes, or any other medium from which a computer can read.

The host computer 22 includes a database management system ("DBMS") 34, which is one or more programs and/or hardware circuitry, configured to access data stored in the database 32. In a presently preferred embodiment, each of the user stations 24 includes its own database applications layer 36, which is one or more programs and/or hardware circuitry configured to interact with the DBMS 34.

The respective database applications layer 36 of a user station 24 allows a user of the computer system 20 to access data from the database 32 by forming and submitting queries on the user station 24. In particular, in a presently preferred embodiment, a user-submitted query is converted into an SQL statement by the database applications layer 36 resident in the respective user station 24. SQL is a standard language used in relational database management systems. An SQL query is the respective user query formatted in SQL. The SQL query is issued to the DBMS 34, which executes the SQL query and returns a responsive data result set to the user.

Although SQL is a presently preferred language, other languages may alternatively be used for executable queries. In other alternative embodiments, a user query may be submitted to a respective database applications layer 36 in an appropriate language format for execution by the DBMS 34.

In alternative embodiments, an equivalent of the database applications layer 36 may reside on a server system (e.g., a SUN® SPARCstation™) with one or more user stations 24 (i.e., "thin clients") either locally, or remotely, connected to the server system. In this alternative configuration, the thin clients support an appropriate user interface, which is generally one or more programs that assist a user to access the database 32. In other alternative embodiments, the user stations 24 are "dumb" terminals. In this alternative configuration, an equivalent of the database applications layer 36 may reside on the host computer 22, along with the DBMS 34, or, alternatively, can reside on a separate, second computer (not shown) which interfaces with the host computer 22.

Figure 1B:
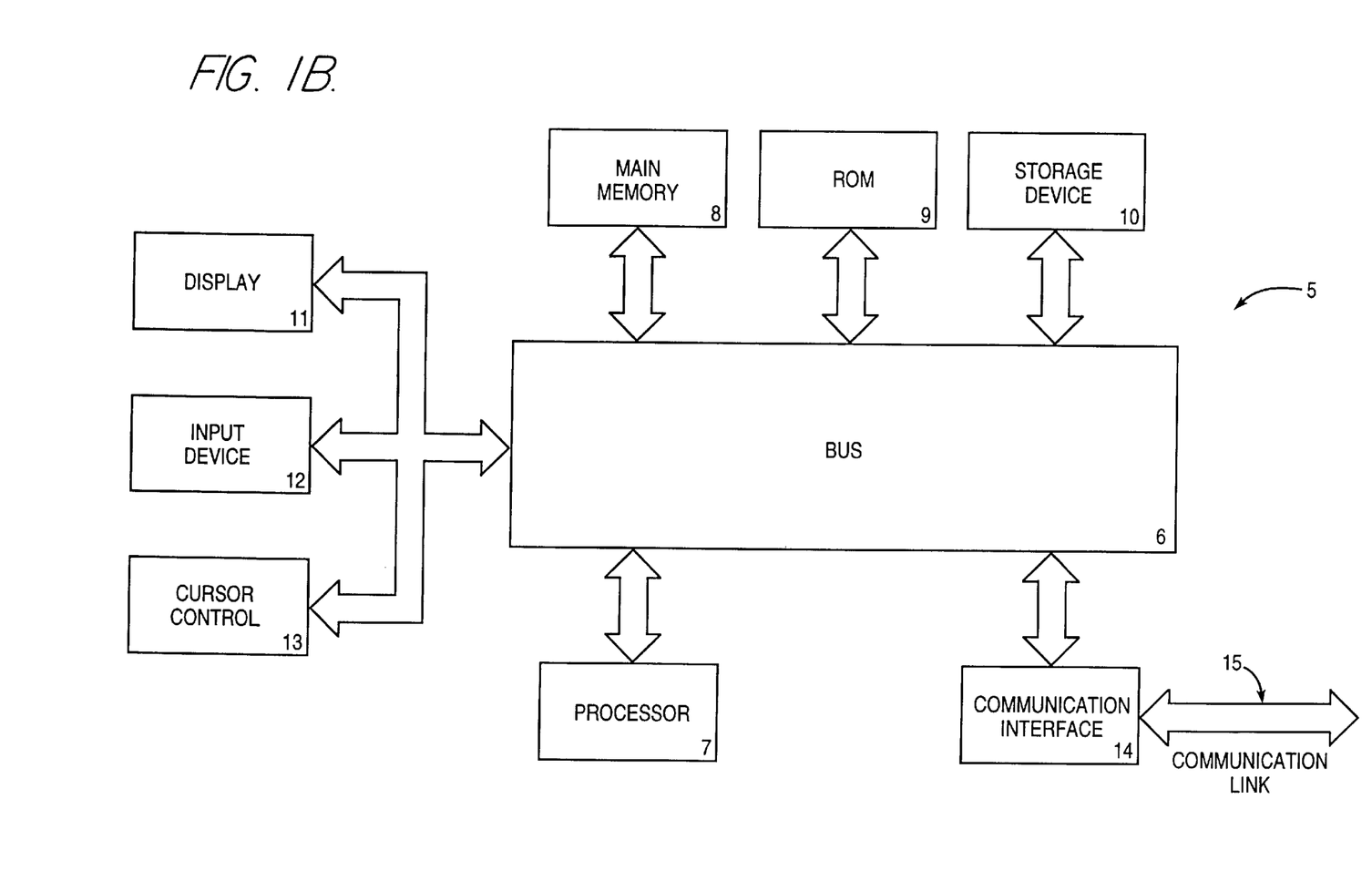
FIG. 1B is a simplified block diagram of an exemplary user station and an exemplary host computer of FIG. 1A.

Referring to FIG. 1B, in a presently preferred embodiment, each user station 24 and the host computer 22 (each referred to generally as a processing unit) embodies a general architecture 5. A processing unit includes a bus 6 or other communication mechanism for communicating instructions, messages and data (collectively, information), and one or more processors 7 coupled with the bus 6 for processing information. A processing unit also includes a main memory 8, such as a random access memory (RAM) or other dynamic storage device, coupled to the bus 6 for storing dynamic data and instructions to be executed by the processor(s) 7. The main memory 8 also may be used for storing temporary data (i.e., variables) or other intermediate information during execution of instructions by the processor(s) 7.

A processing unit may further include a read only memory (ROM) 9 or other static storage device coupled to the bus 6 for storing static data and instructions for the processor(s) 7. A storage device 10, such as a magnetic disk or optical disk, may also be provided and coupled to the bus 6 for storing data and instructions for the processor(s) 7.

A processing unit may be coupled via the bus 6 to a display 11, such as a cathode ray tube (CRT), for displaying information to a user. An input device 12, including alphanumeric and other keys, is coupled to the bus 6 for communicating information and command selections to the processor(s) 7. Another type of user input device may include a cursor control 13, such as a mouse, a trackball, a fingerpad, or cursor direction keys for communicating direction information and command selections to the processor(s) 7 and for controlling cursor movement on the display 11.

According to one embodiment of the invention, the individual processing units perform specific operations by their respective processor(s) 7 executing one or more sequences of one or more instructions contained in the main memory 8. Such instructions may be read into the main memory 8 from another computer-readable medium, such as the ROM 9 or the storage device 10. Execution of the sequences of instructions contained in the main memory 8 causes the processor(s) 7 to perform the process steps described herein.

In alternative embodiments, hard-wired circuitry may be used in place of or in combination with software instructions to implement the invention. Thus, embodiments of the invention are not limited to any specific combination of hardware circuitry and/or software.

The term "computer-readable medium", as used herein, refers to any medium that provides information to the processor(s) 7. Such a medium may take many forms, including, but not limited to, non-volatile, volatile and transmission media. Non-volatile media, i.e., media that can retain information in the absence of power, includes the ROM 9. Volatile media, i.e., media that can not retain information in the absence of power, includes the main memory 8. Transmission media includes coaxial cables, copper wire and fiber optics, including the wires that comprise the bus 6. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 7 can retrieve information.

Various forms of computer-readable media may be involved in providing one or more sequences of one or more instructions to the processor(s) 7 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 6 may receive the infrared signals and place the instructions therein on the bus 6. The bus 6 may carry the instructions to the main memory 8, from which the processor(s) 7 thereafter retrieves and executes the instructions. The instructions received by the main memory 8 may optionally be stored on the storage device 10, either before or after their execution by the processor(s) 7.

Each processing unit may also include a communication interface 14 coupled to the bus 6. The communication interface 14 provides two-way communication between the respective user stations 24 and the host computer 22. The communication interface 14 of a respective processing unit transmits and receives electrical, electromagnetic or optical signals that include data streams representing various types of information, including instructions, messages and data.

A communication link 15 links a respective user station 24 and a host computer 22. The communication link 15 may be a LAN 26, in which case the communication interface 14 may be a LAN card. Alternatively, the communication link 15 may be a PSTN 28, in which case the communication interface 14 may be an integrated services digital network (ISDN) card or a modem. Also, as a further alternative, the communication link 15 may be a wireless network 30.

A processing unit may transmit and receive messages, data, and instructions, including program, i.e., application, code, through its respective communication link 15 and communication interface 14. Received program code may be executed by the respective processor(s) 7 as it is received, and/or stored in the storage device 10, or other associated non-volatile media, for later execution. In this manner, a processing unit may receive messages, data and/or program code in the form of a carrier wave.

Figure 2:
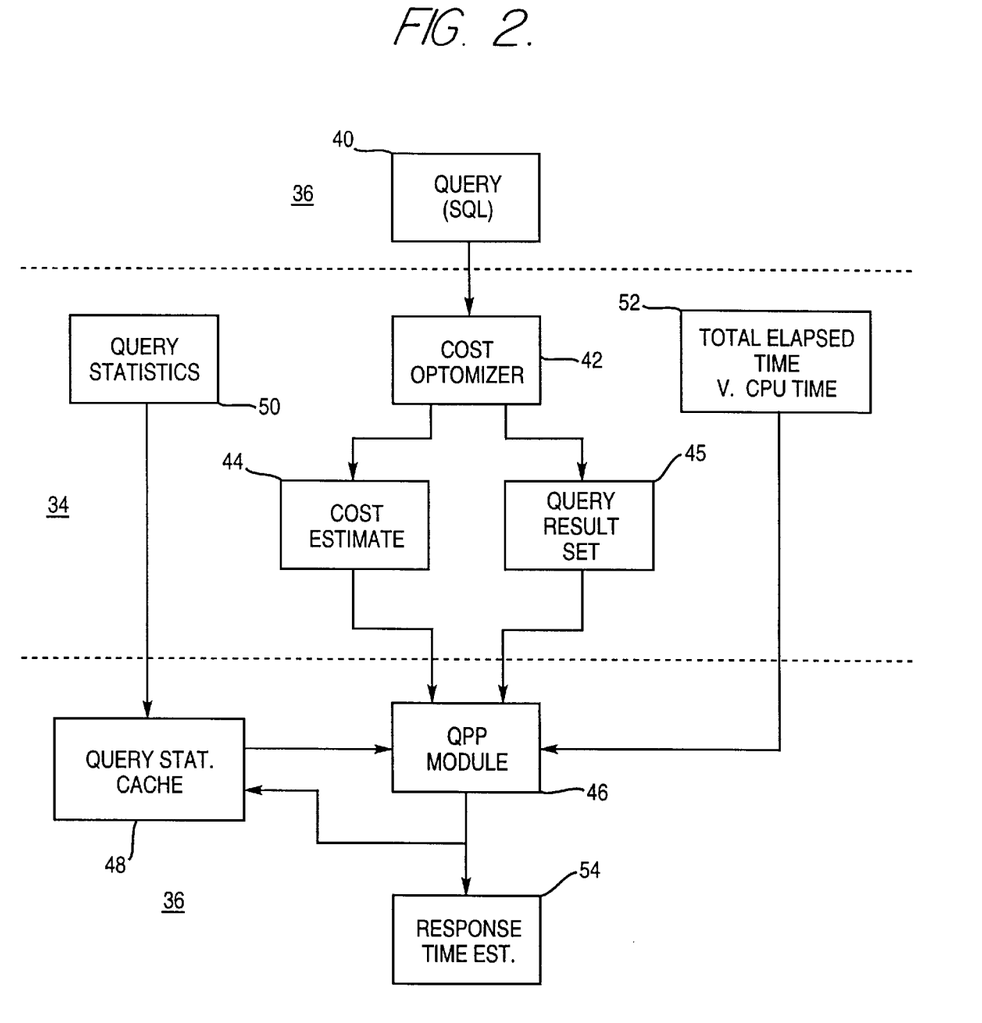
FIG. 2 is a high-level flow chart depicting a preferred process for obtaining database query response time estimates in the computer system of FIG. 1A, including use of a query performance prediction ("QPP") module.

Referring to FIG. 2, in accordance with a general aspect of the invention, an ad hoc query 40 is converted into a SQL statement by the database applications layer 36 residing in the respective user station from which the query 40 is input by a user. The SQL statement is transmitted to a cost optimizer 42 module associated with the DBMS 34 at the host computer 22. The cost optimizer 42 considers available access paths to the requested data from the database 32, and derives a plan for executing the query that is most efficient based on statistics maintained in a data dictionary associated with the respective table(s), along with their associated clusters and indexes, accessed by the SQL statement representing the query 40.

In particular, the cost optimizer 42 generates a set of potential execution plans (not shown) for executing the respective query SQL statement (40) based on the available access paths, and estimates the relative "cost" of each potential execution plan based on the data distribution and storage characteristics for the respective tables, clusters and indexes to be used. Execution plans with greater relative costs generally take more time to execute than those with smaller relative costs, although the relationship between cost and execution time is by no means linear, and depends on many other factors. An exemplary preferred cost optimizer is provided in the Oracle7.3™ version of the Oracle® database product produced and distributed by Oracle Corporation, Redwood City, Calif., USA.

The cost optimizer 42 compares the estimated costs of the potential execution plans and returns the smallest estimated cost 44, along with a result set 45 representing the selected execution plan for the input query 40, to a query performance prediction ("QPP") module 46 residing within the database applications layer 36 of the respective user station 24. The QPP module 46 compares the estimated cost 44 and result set 45 for the present query 40 to the recorded estimated costs and result sets of past queries, searching out those past queries having the same or similar estimated costs for accessing the same, or similar, tables and items in the database located in a query statistics cache 48 associated with the database applications layer 36.

Figure 3:
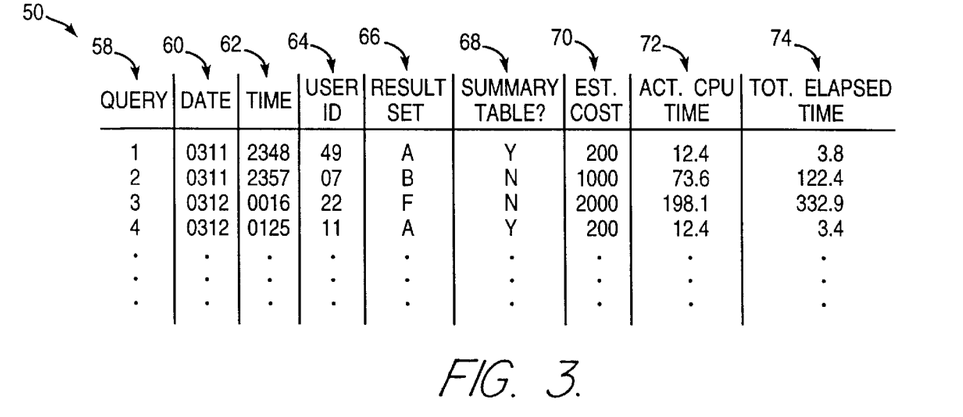
FIG. 3 is a simplified block diagram illustrating a statistical database of query records compiled by a database management system in the computer system of FIG. 1A.

More particularly, referring additionally to FIG. 3, each user station 24 records pertinent information for each new user query, which are collected and maintained by the host computer 22 in a query history 50. In a presently preferred embodiment, the query history 50 includes: the query ID 58, the date 60 and time 62 at which the query was executed; the user ID 64 of the user station 24 submitting the query; an identification of the result set 66 for the query—i.e., the particular table(s) and column(s) that were accessed; whether the query was satisfied from a pre-computed summary table 68; the estimated cost 70 for the query; the actual CPU time 72 used in running the query; and the estimated time 73 and actual total elapsed time 74 required for the system 20 to respond to the query.

The recorded query history 50 is preferably loaded into the query statistics cache 48 of the respective QPP modules of the user stations 24 whenever a user "logs on" to the computer system, or after a specified time interval since a last update. The query history 50 is preferably kept current, so that ongoing changes in the computer system 20 or database 32 do not significantly skew the statistical correlation of past query results with future query response time estimations.

Figure 4:
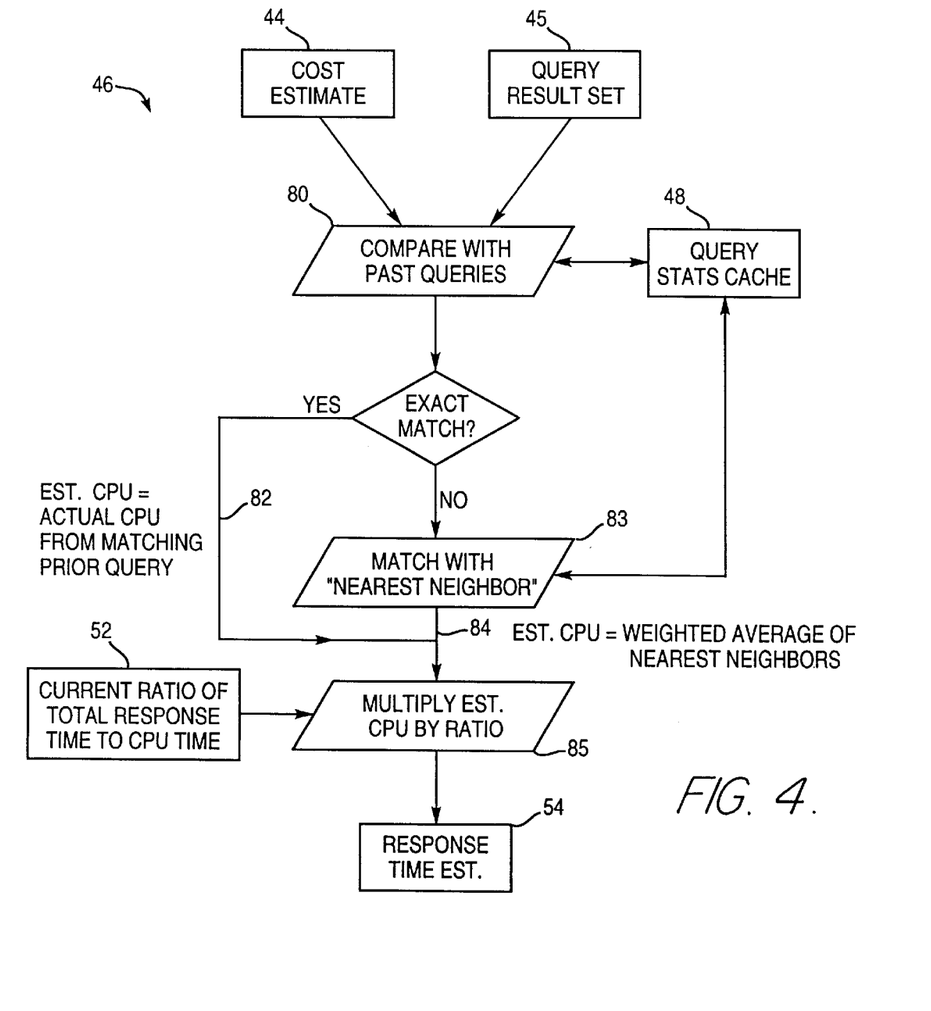
FIG. 4 is a flow chart depicting a preferred process for estimating query response times by the QPP module of FIG. 2.

Referring additionally to FIG. 4, the QPP module 46 compares 80 the cost estimate 44 and result set 45 for the present query 40 to the recorded estimated costs and result sets of past queries stored in the query statistics cache 48. If an exact match is found between the present query 40 and a recorded past query 58 stored in the cache 48 (i.e., wherein both queries have the same estimated costs for the same result sets), the QPP module 46 selects the recorded actual CPU time 72 of the matching past query 58 as an estimated CPU time 82 for the present query 40.

If no exact match is found, a nearest neighbor algorithm 83 is employed to extrapolate an estimated CPU time 84 based on a weighted average of CPU times for the closest matching stored queries—i.e., from the "nearest neighbors" of the present query 40 based on the respective recorded estimated costs and result sets of the past queries. Notably, if a past query having an identical result set was executed using a summary table, the estimated response time can be approximated to a selected (e.g., minimum) value. A preferred methodology for the use of summary tables is provided in U.S. patent application Ser. No. 08/962,533, entitled "Summary Table Query Routing," filed on the same day as the present application and fully incorporated herein by reference. A preferred methodology for creating summary tables is provided in U.S. patent application Ser. No. 08/962,029, entitled "Summary Table Management In A Computer System," which was also filed on the same day as the present application and which is also fully incorporated herein by reference.

A presently preferred embodiment of the nearest neighbor algorithm employed by the QPP module 46 is disclosed in the form of a computer program listing attached below.

The estimated CPU time is multiplied 85 by a current ratio 52 of total elapsed time-to-CPU time for the computer system 20 to produce an estimated total elapsed query response time 54. The ratio 52 of total elapsed time-to-CPU time is preferably calculated by the DBMS 34 based on all user database queries made in the system 20, regardless of the particular tables and items accessed, and is updated to include only the most recent queries in order to reflect current system operating conditions.

In accordance with a further general aspect of the invention, the estimated total elapsed query response time 54 is then returned to the user so that a decision (whether automatic or manual) can be made as to whether to continue with the query 40. As noted above, the estimated total response time 54 is also stored in the query history 50 (i.e., item 73), in order to later be compared to the actual elapsed response time (item 74) and thereby provide feedback information regarding the accuracy of the response time estimation process.

Further considerations may be included in the response time estimation process, if desired, include statistical evidence of estimated times versus actual response times, whereby each response time estimate can be statistically qualified by a calculated degree of certainty (i.e., by a "plus or minus x%") based on a comparison of past results.

In alternate preferred embodiments, the time and date statistics of the past queries may also be used in order to factor in differences in elapsed system time between periods of relatively heavy and relatively light system usage. Likewise, a multiplying factor for individual users or groups of users may be used in the response time estimation process in order to take into account differences caused by transmission time variances due to some users being located more remotely from the computer system, or being connected by a slower transmission medium, than other users.

Thus, while preferred embodiments of methods and apparatus for estimating the time required for a computer system to respond to database queries have been shown and described, it will be apparent to one of ordinary skill in the art that numerous alterations may be made without departing from the spirit or scope of the invention.

By way of example, although a QPP module for estimating query response times has been disclosed and described as being deployed in "intelligent" user stations (i.e., with separate data storage and computing abilities), it will be readily apparent to those skilled in the art that the invention may be equally adapted for use with alternate system architectures.

For example, the QPP module could be adapted to reside and operate in the host computer, along with (or as part of) the DBMS. An advantage of this alternate configuration is that user queries may be input from network terminals having little (or no) independent storage or processing capabilities. In a still further alternate embodiment, the QPP module could be adapted to reside and operate in an intermediary gateway server system that connects multiple user stations to one or more separate host computer systems. With this later configuration, query response time estimates can advantageously be made for queries involving multiple different databases and/or combinations thereof.

In accordance with volume 37, section 1.96 of the Code of Federal Regulations, a preferred computer program for estimating the time required for a computer system to respond to a database query as deployed in a presently preferred applications program in accordance with the teachings of the present invention is as follows:

```
DCENumber
DCEQuerypredictionStats::
EstimateElapsedTime    (const DCENumber& cost,
                        const DCEString& objectUseKey)
{ OLDIAGSTRT (OLX::GetInternalDiagStream(), kDCEDebug, 1)
    << "DCEQueryPredictionStats::EstimateElapsedTime()"    << endl
    << "  Estimating time for cost: " << cost              << endl
    << OLDIAGEND;
// If user preferences have turned off stats then return zero
if ( mPerformQpp == false )
{ OLDIAGSTRT (OLX::GetInternalDiagStream(), kDCEDebug, 1)
    << "DCEQueryPredictionStats::EstimateElapsedTime()" <<endl
    << "   User prefs turned off QPP - returning estimated time
        of 0" << endl
    << OLDIAGEND;
    return 0;       }
// If cost is zero or null then return zero
if ( cost.is null() || cost == 0 )
{ OLDIAGSTRT(OLX::GetInternalDiagStream(), kDCEDebug, 1)
    << "DCEQueryPredictionStats::EstimateElapsedTime()" << endl
    << "   QPP cost is zero or null - returning estimated time
        of 0" << endl
    << OLDIAGEND;
    return 0;       }
// If there are no stats then return an estimated time of 1
second.
if (mpStatSet->size() <= 1)
{ OLDIAGSTRT (OLX::GetInternalDiagStream(), kDCEDebug, 1)
    << "DCEQueryPredictionStats::EstimateElapsedTime()"    << endl
    << "   No stats - returning estimated time of 1"       << endl
```

-continued

```
        << OLDIAGEND;
        return DCENumber(1);         }
// If an object use key has been specified then we may want to
// look for all stats for that key value. A load is not
// attempted if the user prefs have turned off this feature or if
// the key has already been loaded
if ( !objectUseKey.IsEmpty()              &&
     mLoadStatsByObjectUseKey             &&
     mLoadedObjectUseKeys.find(objectUseKey) ==
     mLoadedObjectUseKeys.end() )
     { Loadstatistics(objectUseKey);
     // record that we've loaded this object use key so we don't
     // attempt to load it again
     bool noClash =
     (mLoadedObjectUseKeys.insert(objectUseKey)).second;
        OL_ASSERT( noClash == true );        }
// Decide whether to use the whole set of stats or a subset based
// upon the object use key.
     DCEQueryStatSet* pCurrentStatSet;
     DCEQueryStatSet    statsSubset;
     if ( mpStatSet->ContainsObjectUseKey(objectUseKey) )
{    // we have some stats specific to the set of objects we are
     // trying to query - let's extract those as a subset and use
     // them
     mpStatSet->ExtractStatsByObjs(objectUseKey, statsSubset);
     pCurrentStatSet = &statsSubset;     }
else
{    // no stats exist for this set of objects - use the whole set
     // of existing stats for estimating the query time
     pCurrentStatset = mpStatSet;       }
//   Get references to the cost and date indexes we need to use
     const DCEStatisticsPByCost& statsByCost =
     pCurrentStatSet->GetStatsByCost ();
     const DCEStatisticsPByDate& statsByDate =
     pCurrentStatSet->GetStatsByDate();
//   If we are using cpu time then find out the cpu/elapsed time
//   ratio, otherwise assume a ratio of 1
     DCENumber weightedTimeRatio = 1;
     if ( mUseCpuTime )
{    // Estimate the cpu/elapsed time ratio by performing a
     // weighted average on the 10 newest stats (ignoring those
     // with zero or null cpu times)
     OLDIAGSTRT (OLX::GetInternalDiagStream(), kDCEDebug, 1)
          << "DCEQueryPredictionStats::EstimateElapsedTime()" << endl
          << "   Estimating cpu/elapsed time ratio..."          << endl
          << OLDIAGEND;
     DCENumber runningTotal    = 0;
     DCENumber ratio;
     DCENumber divider         = (int)0;
     # ifdef _DEBUG
{    DCEStatisticsPByDateCItr lastElement = statsByDate.end();
        OL_ASSERT( statsByDate.empty() ||
           (* (statsByDate.begin()))->datestamp >=
(* (--lastElement)) ->dateStamp );        }
# endif
     DCEStatisticsPByDatecItr dateItr = statsByDate.begin();
     for (int i = 0; i < 10 && dateItr != statsByDate.end();
dateItr++)
{    DCENumber actCpu     = (*dateItr)->actualCpuTime;
     DCENumber actElapsed = (*dateItr)->actualElapsedTime;
// ignore stats with null or zero cpu times and zero elapsed
// times
        if ( actCpu.is_null() || actCpu == 0 || actElapsed == 0 )
        continue;
        ratio = (OLNumber) ( actCpu ) / (OLNumber) ( actElapsed );
        OLDIAGSTRT (OLX::GetInternalDiagStream(), kDCEDebug, 2)
          << "  Using stat, actualCPU:"     << actCpu
          << ", actualElapsed: "             << actElapsed
          << ", ratio: "                     << ratio << endl
          << OLDIAGEND;
        runningTotal  += ratio * (10 – i);
        divider       += (10 – i);
        i++;               }
     if ( divider == 0 || runningTotal == 0 )
     weightedTimeRatio = 1;
     weightedTimeRatio = runningTotal / OLNumber(divider); }
     OLDIAGSTRT (OLX::GetInternalDiagStream(), kDCEDebug, 1)
          << "DCEQueryPredictionStats::EstimateElapsedTime()" << endl
          << "   Weighted time ratio: " << weightedTimeRatio  << endl
```

-continued

```
        << OLDIAGEND;
// Searching by cost find the 10 "nearest" stats
// note that in the following code, the time (cpu or elapsed)
// used depends on the value of mUseCpuTime.
// First create a dummy object to use for searching
     DCEQPPStatistic stat;
     stat.cost = cost;
// Find the stat within the existing stats with the closest cost
     DCEStatisticsPByCostCItr nearestCost =
     statsByCost.lower_bound(&stat);
// Calculate the weighted avg cost and time in 3 stages:
     DCENumber costRunningTotal    = 0;
     DCENumber timeRunningTotal    = 0;
     DCENumber divider             = (int)0;
     DCEStatisticspByCostCItr costItr;
     int           offset;
// Check that we are not pointing at the end and that there is
// something there at all....
     if ( nearestCost == statsByCost.end() )
        nearestCost--;
     OLDIAGSTRT (OLX::GetInternalDiagStream(), kDCEDebug, 1)
        << "DCEQueryPredictionStats::EstimateElapsedTime() " << endl
        << " Searching for nearest existing stat by cost. Found
cost: "
        << (*nearestCost)->cost << endl
        << OLDIAGEND;
// first, find the maximum cost offset to be considered within
// the existing stats
     DCENumber maxCostOffset (0);
{    for (costItr = nearestCost, offset = 0; offset < 5;
     costItr--, offset++)
{    DCENumber costDifference = cost – (*costItr)->cost;
        costDifference.Abs();
        if ( costDifference > maxCostOffset )
           maxCostOffset = costDifference;
        if ( costItr == statsByCost.begin())
           break;           }
     if (nearestCost != statsByCost.end())
{    for (costItr = nearestCost, costItr++, offset = 1;
        offset < 5 && costItr != statsByCost.end();
        costItr++, offset++)
{    DCENumber costDifference = cost – (*costItr)->cost;
        costDifference.Abs();
        if ( costDifference > maxCostOffset )
           maxCostOffset = costDifference;       }    }
     maxCostOffset++;
     OLDIAGSTRT (OLX::GetInternalDiagStream(), kDCEDebug, 1)
        << "DCEQueryPredictionStats::EstimateElapsedTime()"   << endl
        << "  Found max cost offset: " << maxCostOffset      << endl
        << OLDIAGEND;         }
// second, consider the five nearest stats before (and including)
// the closest one
     OLDIAGSTRT (OLX::GetInternalDiagStream(), kDCEDebug, 1)
        << "DCEQueryPredictionStats::EstimateElapsedTime()"   << endl
        << "   Calculating weighted averages of cost & time..." <<
     endl
        << OLDIAGEND;
        for (costItr = nearestCost, offset = 0; offset < 5; costItr--,
        offset++)
{    DCENumber costDifference = cost – (*costItr)->cost;
     costDifference.Abs();
     DCENumber costOffset (OLNumber(maxCostOffset) –
OLNumber(costDifference));
     DCENumber time = ( mUseCpuTime ) ?
((*costItr)->actualCpuTime) :
((*costItr)->actualElapsedTime);
        if ( !time.is_null() )
{    costRunningTotal += (*costItr)->cost * OLNumber(costOffset);
        timeRunningTotal += time         *
OLNumber(costOffset);
        divider          += costOffset;
        OLDIAGSTRT (OLX::GetInternalDiagstream(), kDCEDebug, 2)
           << "  Using cost: " << (*costItr)->cost
           << ", stat offset: " << offset
           << ", cost offset: " << costDifference
           << endl
           << OLDIAGEND;           }
        if (costItr == statsByCost.begin())
           break;           }
```

-continued

```
// then, consider the five nearest stats after (but not
// including) the closest one
   if (nearestCost != statsByCost.end())
   { for (costItr = nearestCost, costItr++, offset = 1;
            offset < 5 && costItr != statsByCost.end();
            costItr++, offset++)
      { DCENumber costDifference = cost - (*costItr)->cost;
      costDifference.Abs();
      DCENumber costOffset (OLNumber(maxCostOffset) -
OLNumber (costDifference));
      DCENumber time = ( mUseCpuTime ) ?
((*costItr)->actualCpuTime) :
((*costItr)->actualElapsedTime);
         if ( !time.is_null() )
         {   costRunningTotal += (*costItr)->cost *
             OLNumber(costOffset) ;
            timeRunningTotal += time * OLNumber(costOffset);
            divider           += costOffset;
            OLDIAGSTRT (OLX::GetInternalDiagStream(), kDCEDebug, 2)
             << "   Using cost: " << (*costItr)->cost
             << ", stat offset: " << offset
             << ", cost offset: " << costDifference
             << endl
             << OLDIAGEND;     }    }    }
// Now perform the calculations for weighted avgs
   DCENumber weightedCost = costRunningTotal / OLNumber(divider);
   DCENumber weightedTime = timeRunningTotal / OLNumber(divider);
OLDIAGSTRT (OLX::GetInternalDiagStream(), kDcEDebug, 1)
   << "DCEQueryPredictionStats::EstimateElapsedTime()"   << endl
   << "   Cost Running Total:  " << costRunningTotal     << endl
   << "   Time Running Total:  " << timeRunningTotal     << endl
   << "   Divider:             " << divider              << endl
   << "   Weighted Cost:       " << weightedCost         << endl
   << "   Weighted Time:       " << weightedTime         << endl
   << OLDIAGEND;
// Estimate the time
   DCENumber estTime = (cost / weightedCost) * weightedTime;
// Finally, estimate the elapsed time
   DCENumber estElapsedTime =  ( estTime == 0 || weightedTimeRatio
                                 == 0 )
                              ? (OLNumber(0))
                              : ((OLNumber)estTime /
(OLNumber)weightedTimeRatio) ;
   OLDIAGSTRT (OLX::GetInternalDiagStream(), kDCEDebug, 1)
      << "DCEQueryPredictionStats::EstimateElapsedTime()"   << endl
      << "   Estimated Time:          " << estTime          << endl
      << "   Estimated Elapsed Time:  " << estElapsedTime   << endl
      << OLDIAGEND; }
if(estElapsedTime<DCENumber(DCE_MIN_SENSIBLE_ESTIMATE))
{ estElapsedTime = DCE_MIN_SENSIBLE_ESTIMATE;
   OLDIAGSTRT (OLX::GetInternalDiagStream(), kDCEDebug, 1)
      << "Adjusting estimate to minimum sensible value: "
      << estElapsedTime << endl
      << OLDIAGEND;    }
# ifdef _DEBUG
   long debugTime = estElapsedTime;
# endif
   return estElapsedTime;      }
// DCEQueryPredictionStats::EstimateElapsedTime()
```

Thus, the invention is not to be limited except in accordance with the appended claims.

What is claimed is:

1. A method for estimating the time for a computer system to respond to a database query, comprising:

determining an estimated cost for executing the database query;

identifying, using the estimated cost, previously executed queries comprising characteristics the same as, or similar to, the database query; and deriving an estimate of the time required for responding to the database query based on information associated with the previously executed queries.

2. The method of claim 1, in which identifying previously executed queries comprises comparing specific data sought in the database query with specific data sought in queries previously executed.

3. The method of claim 1, in which deriving an estimate of the time required for responding to the database query comprises generating an estimated processing time for the database query using an actual CPU processing time for a previously executed query, and applying a current ratio to the estimated processing time, the current ratio comprising a ratio of elapsed time for the computer system to respond to one or more prior queries to actual CPU time to process the one or more prior queries.

4. The method of claim 3, in which the actual CPU processing time for a previously executed query comprises the actual CPU processing time to process a previously executed query identified as comprising characteristics the same as, or similar to, the database query, and the one or more prior queries comprises one or more of the most current executed database queries.

5. The method of claim 4, in which the current ratio further comprises a weighted average of elapsed time to actual CPU time.

6. A method for estimating the time required for a computer system to respond to a present query, comprising:

identifying a plurality of previously executed queries comprising characteristics the same as, or similar to, the present query; and deriving an estimate of the time required for responding to the present query based on information associated with the plurality of previously executed queries.

7. The method of claim 6, in which identifying a plurality of previously executed queries comprises comparing an estimated cost for executing the present query with estimated costs of executing a plurality of prior queries, and comparing a result set of the present query with result sets of the plurality of prior queries, a result set comprising an identification of the tables accessed in a database to respond to the respective present query or respective prior query.

8. The method of claim 6, further comprising determining an estimated cost for executing the present query, and in which deriving an estimate of the time required for responding to the present query comprises determining whether a prior executed query has an identical estimated cost as the estimated cost for executing the present query.

9. The method of claim 6, in which deriving an estimate of the time required for responding to the present query comprises generating an estimated processing time for the present query using an actual CPU processing time of a previously executed query, and applying a current ratio to the estimated processing time, the current ratio comprising a ratio of elapsed times to actual times, the elapsed times comprising the times for the computer system to respond to a set of one or more prior queries and the actual times comprising the actual CPU processing times of the set of one or more prior queries.

10. The method of claim 8, in which deriving an estimate of the time required for responding to the present query further comprises extrapolating an estimated processing time for executing the present query based on the actual processing times of the plurality of previously executed queries, if no prior executed query has an estimated cost equal to the estimated cost for executing the present query.

11. The method of claim 10, in which extrapolating an estimated processing time comprises determining an estimated processing time based on a weighted average of the actual processing times of the plurality of previously executed queries.

12. A machine readable medium having stored thereon a program for causing a computer to:

determine an estimated cost for executing a present query;

identify, using the estimated cost, one or more previously executed queries comprising characteristics the same as, or similar to, the present query; and derive an estimate of the time required for responding to the present query based on information associated with the one or more previously executed queries.

13. A machine readable medium having stored thereon a program for causing a computer to:

identify one or more previously executed queries comprising characteristics the same as, or similar to, a present query; and derive an estimate of the time to respond to the present query based on information associated with the one or more previously executed queries.

14. The machine readable medium of claim 13, in which to identify one or more previously executed queries, the program further causes the computer to compare an estimated cost for executing the present query with estimated costs of executing a plurality of prior queries, and compare a result set of the present query with result sets of the plurality of prior queries, a result set comprising an identification of the database tables accessed to respond to the respective present query or respective prior query.

15. The machine readable medium of claim 13, in which to derive an estimate of the time to respond to the present query, the program further causes the computer to generate an estimated processing time for the present query using an actual CPU processing time of a previously executed query, and apply a current ratio to the estimated processing time, the current ratio comprising a ratio of elapsed time to actual CPU time, the elapsed time comprising one or more elapsed times for the computer system to respond to one or more prior executed queries, and the actual CPU time comprising one or more actual CPU processing times of the one or more prior executed queries.

16. A computer system, comprising:

a computer; and a data storage device, said data storage device comprising a program residing thereon for causing said computer to estimate a time for the computer system to respond to a present database query by determining an estimated cost for executing the present database query, identifying, using the estimated cost, previously executed queries comprising characteristics the same as, or similar to, the present database query, and deriving an estimate of the time required for responding to the present database query based on information associated with the previously executed queries.

17. A computer system, comprising:

a computer; and a data storage device, said data storage device comprising a program residing thereon for causing said computer to estimate a time for the computer system to respond to a present query by identifying a previously executed query comprising characteristics the same as, or similar to, the present query, and deriving an estimate of a time for responding to the present query based on information associated with the previously executed query.

18. The computer system of claim 17, in which said program further causes said computer to compare an estimated cost for executing the present query with estimated costs of executing a plurality of prior queries, and compare a result set of the present query with result sets of the plurality of prior queries, a result set comprising an identification of the database tables accessed to respond to the respective present query or respective prior query.

19. The computer system of claim 18, in which said program further causes said computer to generate an estimated processing time for the present query using an actual CPU processing time of a previously executed query, and apply a current ratio to the estimated processing time, the current ratio comprising a ratio of one or more elapsed times for the computer system to respond to a set of prior queries to one or more actual CPU processing times for the set of prior queries.

20. The computer system of claim 19, in which the actual CPU processing time of a previously executed query comprises the actual CPU processing time to process the previously executed query comprising characteristics the same as, or similar to, the present query, and the set of prior queries comprises one or more of the most current executed queries.

* * * * *